G. E. LOB.
ELBOW FOR PNEUMATIC CONVEYERS.
APPLICATION FILED JAN. 6, 1913.
1,108,918.
Patented Sept. 1, 1914.
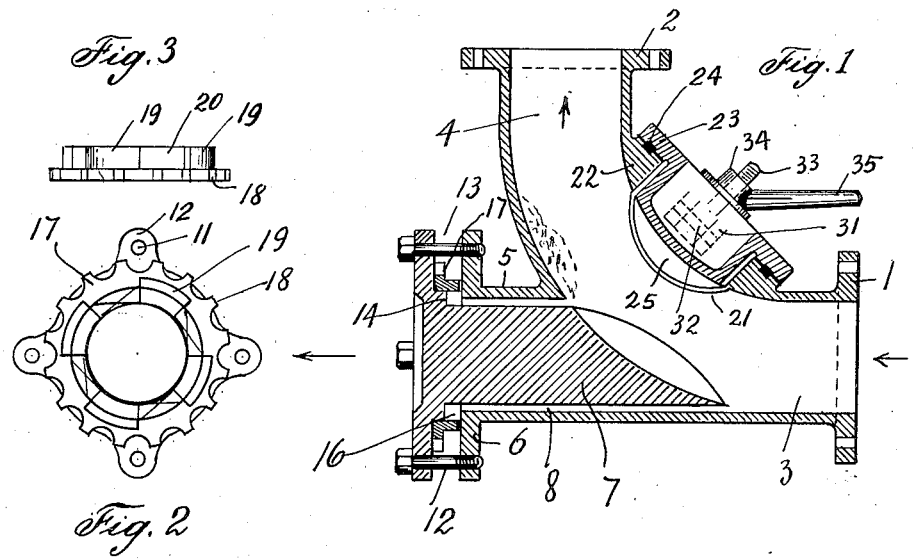
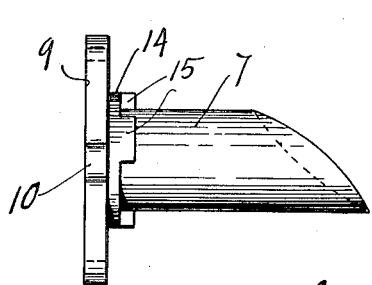
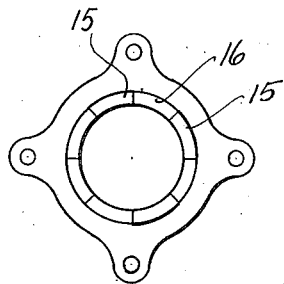
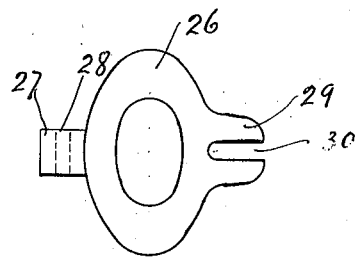
WITNESSES
LeRoy Nelson.
Jas Maier
INVENTOR
Guido E. Lob
By Robt. Klotz
Atty.

UNITED STATES PATENT OFFICE.

GUIDO E. LOB, OF CHICAGO, ILLINOIS, ASSIGNOR TO PNEUMATIC CONVEYOR COMPANY, OF CHICAGO, ILLINOIS.

ELBOW FOR PNEUMATIC CONVEYERS.

1,108,918.　　　　Specification of Letters Patent.　　Patented Sept. 1, 1914.

Application filed January 6, 1913. Serial No. 740,284.

*To all whom it may concern:*

Be it known that I, GUIDO E. LOB, a citizen of the United States, residing at Chicago, Illinois, have invented certain new and useful Improvements in Elbows for Pneumatic Conveyers, of which the following is a specification.

The essential object of this invention is to provide an improved form of elbow for pneumatic conveyers.

It has been found heretofore where ordinary elbows are used to connect two lengths of pipe which happen to be set at an angle to each other that the abrasion of the grain, ashes, and the like will very quickly wear away the elbow. Malt in particular quickly wears holes in the elbows, and many articles which it is customary to handle by pneumatic conveyers destroy the elbows in a very short time even though such articles produce practically no effect whatsoever upon the straight lengths of pipe. In order to provide an elbow which will not wear out, it has been proposed heretofore not only to make the material of which the elbow is formed very much thicker than the straight lengths of pipe, but also to provide the elbow with three arms instead of two, thus shaping the elbow practically like a long-sweep T, and in one arm of the T to place a solid plug. The grain or malt would strike this plug and the abrading effect of the articles handled by the conveyer would be expended upon the solid metal plug rather than upon the wall of the elbow, and the plug could be easily renewed or its position changed from time to time, but although the metal plugs are practically indestructible they have not given entire satisfaction because the elbow will wear away at the joint between the plug and the main body of the elbow, and for other reasons. In this invention, use is made of the metal plugs, but the elbow is equipped with other appliances to obviate the difficulties arising from the use of the old-style constructions.

In the drawings, Figure 1 is a longitudinal or vertical sectional view of an elbow constructed as hereinafter described; Fig. 2 is a view of the end of the plug and the valve coöperating therewith looking toward the left in Fig. 1; Fig. 3 is a side elevation of the valve ring, at a right angle to Fig. 2; Fig. 4 is an elevation of the plug detached from the rest of the elbow; Fig. 5 is a companion view to Fig. 4 looking toward the left in said figure; and Fig. 6 is a view of the clamp which locks the cap shown in the upper right-hand corner of Fig. 1.

It is well known in the art that some pneumatic conveyers are operated by suction and others by blowing, and this invention is adapted for use in connection only with the suction-operated conveyers.

The drawings depict an elbow which is used for connecting two lengths of pipe set approximately at right angles to each other, but it will be understood that the invention is not limited to that specific use, for by changing the shape of the elbow it may be used to connect any two conveyer pipes regardless of the angles at which they are disposed.

The conveyer pipes, not shown, are adapted to be secured by bolts or screws to the flanges 1 and 2, and the path of travel of the grain, malt, or the like is as indicated by the arrows in Fig. 1. The fan or other appliance which creates the suction is located at any suitable place beyond the flange 2. As the grain or malt is sucked from the pipe that is connected to the flange 1, it is drawn through the elbow, and were the elbow merely a shell or bent piece of pipe such as is customarily used for steam pipe or water pipe, the elbow would be quickly destroyed or worn out because of the constant cutting and abrading effect of the sharp-pointed articles which are ordinarily handled. As the grain or malt is drawn through the elbow, it naturally tends to strike the curved wall and to abrade the same, and it is one of the essential objects of this invention so to construct an elbow that this abrading effect will be entirely overcome.

The elbow is preferably constructed in the shape which steam fitters and manufacturers of pipe fittings ordinarily call a long-sweep T. The grain or malt is adapted to pass through arms 3 and 4 of the T which are, respectively, the arms adjacent to the flanges 1 and 2. Arm 5 of the T is not connected to a conveyer pipe, however, but is provided with a flange 6 which would afford the means of connection to a conveyer pipe if so desired.

The parts designated by the specific reference numerals 1, 2, 3, 4, 5, and 6 are all parts of a single integral casting.

Within the arm 5 the plug 7 is placed.

As will be clearly evident from Figs. 1 and 4 of the drawings, said plug comprises a solid piece of metal, the right-hand end of which is curved or dished out so as to conform in curvature and shape to the remainder of the interior of the elbow. The plug 7 is slightly less than the diameter of the arm 5 within which the plug is received, and, hence, an air space 8 is left between the plug and the inner surface of the arm 5. At its left-hand end, plug 7 carries a flanged head 9, and this head 9 is provided with ears 10 perforated at 11. Bolts 12, which may be screw-threaded at one end, are received within perforations 11 and within screw-threaded tap-holes in flange 6, and by said bolts 12 the plug 7 can be secured within the arm 5, the parts being so arranged so that a space 13 is left between flanges 9 and 6. Upon plug 7, at the point where the main body portion of the plug is connected to the flange 9, is an annular, cylindrical bead 14 which carries a number of projections 15, there being a port 16 between each adjoining pair of projections. Encircling the bead 14 is a ring or collar 17 which is provided with points 18 projecting out beyond the periphery or flange 9, and the operator may take hold of one or more of the points 18 and thus revolve or partly revolve collar 17 around the plug 7. Said collar carries projections 19, and between these projections 19 are ports or spaces 20. The projections 19 upon the collar and 15 upon the plug 7 are each arcuate in shape, and the size of the parts and their arrangement is such that when the ring 17 is in the position shown in Fig. 2, each projection 19 will be in registration with a projection 15 and each port 20 will be in registration with one of the ports 16, but if the ring 17 be given a partial rotation, each projection 19 will close or partly close one of the ports 15. It will be evident, therefore, that the flange 14 and projections 15 in coöperation with collar 17 and projections 19 serve as a valve which controls, within certain limits, the amount of air permitted to enter the space 8. The space 13 must be sufficiently large to permit the collar 17 to move freely therewithin, though, if it be desired to fix the collar 17 permanently at any desired position, or in other words to lock the valve, the bolts 12 may be tightened and in that way the collar will be firmly clamped between the flanges 6 and 9 and cannot be moved in either direction until the bolts 12 are loosened. On the side of the casting opposite arm 5 a perforation 21 is cut, which perforation is surrounded by a seat 22 and on this seat the cap 23 rests, there being a rubber gasket 24 intermediate the seat and the flange of the cap. The cap, as will be evident from Fig. 1, comprises a flanged portion which rests upon the seat 22, and an indented portion 25 which is concavo-convex in shape and which conforms in shape to the interior of the channel through which the grain or malt must pass. In order to hold the cap 23 in place the clamp 26 is provided. Said clamp is large enough practically to cover over the cap 23 and is provided with an ear or lug 27 perforated at 28 on one side and with a pair of lips 29 on the other side, there being a crotch 30 between the lips. On each side of the opening 21 the elbow is provided with ears 31 (one pair only being shown in Fig. 1 of the drawings), which ears are connected by cross bolts or pivots 32. One of said pivots passes through the perforation 28 in the lug 27, it being understood, of course, that the lug 27 is depressed below the level of the main body of the clamp 26. The other pivot 32 is encircled by the hinged bolt 33, which bolt is likewise received within the crotch 30. The nut 34 screws upon the bolt 33, being turned by the handle or lever 35. When the nut 34 is turned so that it bears upon the lips 29, the clamp 26 will hold the cap 23 firmly in place but when the nut 34 is unscrewed, the cap may be removed. The operator may then easily insert his hand through the perforation 21 so as to remove any dirt or dust that has collected, or for any other needful purpose.

The use and operation of the device will be largely evident from the foregoing detailed description of parts, but in addition to what has heretofore been explained, it may be stated that when the fan is in operation the grain or malt will be sucked through the elbow in the direction indicated by the arrows, Fig. 1. The partial vacuum thus created will draw a certain amount of air in through the channel or passageway 8 and the amount of air thus permitted to enter can be readily controlled by adjustment of the ring 17. If the parts are turned to the position shown in Fig. 2, the port holes 16 and 20 will be wide open, but if the ring be given a partial rotation, the port holes will be partly closed. As the air enters the interior of the elbow, it passes over or around the circular edge of the right-hand end of the plug 7 and thus forms a cushion of air both upon the curved end of the plug and upon that part of the main casting of the elbow just above the plug. The grain or malt which is being sucked through will, instead of striking the plug 7 or the wall of the elbow thereabove, strike upon this cushion of air and in this manner the abrasive effect of the moving grain or malt will be almost entirely overcome and the force of the moving grain or malt will be largely absorbed by the cushion of air which passes around the plug 7 and over its edges.

It is obvious that many changes in the details of construction and arrangement of parts may be made without departing from the scope of the invention or of the various claims.

I claim as my invention:

1. A device of the character described comprising a member provided with three arms, a plug in one of said arms, there being an air space between the outer surface of said plug and the inner surface of said arm, a ring encircling said plug, and means coöperating with said ring, said ring being adapted to regulate the size of the entrance to said air space, and means to secure said plug upon said member.

2. A device of the character described comprising a member provided with three arms, a plug in one of said arms, there being an air space between the outer surface of said plug and the inner surface of said arm, an annular band or bead upon said plug, said bead being formed with ports, a valve adapted to close said ports, and means for securing said plug upon said member.

3. A device of the character described comprising a member provided with three arms, a plug in one of said arms, there being an air space between the outer surface of said plug and the inner surface of said arm, an annular band or bead upon said plug, said bead being formed with ports, a ring encircling said plug and riding upon said bead, means carried upon said ring and adapted to close said ports, and means for securing said plug upon said member.

4. A device of the character described comprising a hollow casting provided with three arms, a plug in one of said arms, there being an air space between the outer surface of said plug and the inner surface of the arm retaining same, ports allowing access of air to said space, means to regulate the size of said ports, and means to secure said plug within said arm.

5. An attachment for pneumatic conveyers comprising a long-sweep T-coupling, a plug located in one of the arms thereof, there being an air-space between the outer surface of said plug and the inner surface of the arm within which same is placed, said air-space being unobstructed, said plug and the arm supporting same being flanged, and means to connect said flanges together, there being an unobstructed air space between said flanges.

6. An attachment for pneumatic conveyers comprising a long-sweep T coupling, a plug located in one of the arms thereof, said plug being located in alinement with the path of travel of the grain as same enters the coupling, there being an air space between the outer surface of said plug and the inner surface of the arm within which same is placed, said air space being normally unobstructed, means coöperating with said plug and adapted to obstruct said air space, and means for securing said plug in place, the inner end of said plug being a curved surface and being adapted to receive the impact of the grain.

7. An attachment for pneumatic conveyers comprising a long-sweep T coupling, a plug located in one of the arms thereof, the axis of said plug being in alinement with the path of travel of the grain as same enters the coupling and the ends of said plug being adapted to receive the full force and impact of the moving grain, there being an air space between the outer surface of said plug and the inner surface of the arm within which same is placed, there being ports which permit air to enter and pass through said space, and means for securing said plug in place.

In testimony whereof I have hereunto affixed my name in the presence of two witnesses.

GUIDO E. LOB.

Witnesses:
 ROBT. KLOTZ,
 JOSEPH N. NIELSEN.